(12) United States Patent
Rhodes

(10) Patent No.: US 8,591,131 B2
(45) Date of Patent: *Nov. 26, 2013

(54) HAND-HELD DRY-ERASE BOARD SYSTEM

(76) Inventor: Julia M. Rhodes, Sonora, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/798,359

(22) Filed: Apr. 2, 2010

(65) Prior Publication Data

US 2010/0255456 A1 Oct. 7, 2010

Related U.S. Application Data

(63) Continuation-in-part of application No. 11/535,114, filed on Sep. 26, 2006, now Pat. No. 7,717,636, which is a continuation of application No. 11/534,701, filed on Sep. 25, 2006, now abandoned.

(60) Provisional application No. 60/720,634, filed on Sep. 26, 2005.

(51) Int. Cl.
B43K 29/00 (2006.01)

(52) U.S. Cl.
USPC .............. 401/195; 401/52; 401/131; 434/408

(58) Field of Classification Search
USPC .............. 401/195, 52, 131; 434/408; 211/69.1
See application file for complete search history.

(56) References Cited

U.S. PATENT DOCUMENTS

| | | | |
|---|---|---|---|
| 4,875,591 A | | 10/1989 | Mikesell |
| 5,072,483 A | * | 12/1991 | Durand ........................ 15/210.1 |
| 5,263,366 A | | 11/1993 | Sakamoto |
| 5,294,114 A | | 3/1994 | Stillinger |
| 5,599,189 A | | 2/1997 | Kees et al. |
| 5,626,478 A | | 5/1997 | Gatlin |
| 5,743,414 A | | 4/1998 | Baudino |
| 5,957,603 A | * | 9/1999 | Bell ................................. 401/52 |
| 5,987,794 A | * | 11/1999 | Lavi et al. .................. 40/611.04 |
| 5,997,309 A | | 12/1999 | Metheny et al. |
| 6,265,074 B1 | | 7/2001 | Shah et al. |
| 6,347,898 B1 | | 2/2002 | Rhodes et al. |
| 6,595,143 B2 | | 7/2003 | London |
| 6,626,675 B1 | | 9/2003 | Webber et al. |
| 6,666,424 B2 | | 12/2003 | Richardson |
| D496,068 S | * | 9/2004 | Mandel .......................... D19/36 |
| 6,837,715 B2 | | 1/2005 | Beno |
| 6,866,516 B2 | | 3/2005 | Smith et al. |
| 6,893,266 B2 | | 5/2005 | Donelan |
| 6,932,531 B2 | | 8/2005 | Marschand et al. |

* cited by examiner

*Primary Examiner* — David Walczak
(74) *Attorney, Agent, or Firm* — Williams Mullen

(57) ABSTRACT

A hand-held dry-erase board system for efficiently storing a writing instrument in the handle of a portable dry-erase board. The hand-held dry-erase board system includes a frame including a writable surface, a handle, wherein the handle includes an upper end and a lower end and wherein the upper end of the handle is attached to the frame and a clip, wherein the clip is attached to the handle and wherein the clip secures a marker.

20 Claims, 10 Drawing Sheets

HAND-HELD DRY-ERASE BOARD SYSTEM

CROSS REFERENCE TO RELATED APPLICATIONS

This application is a continuation-in-part of U.S. application Ser. No. 11/535,114, filed Sep. 26, 2006, which has issued as U.S. Pat. No. 7,717,636, which is a continuation of U.S. application Ser. No. 11/534, 701, filed Sep. 25, 2006, now abandoned, which claimed the benefit of priority under Title 35, United States Code, Section 119(e) to U.S. provisional patent application Ser. No. 60/720,634 filed Sep. 26, 2005. U.S. Application Ser. Nos. 60/720,634, Ser. No. 11/534,701, and Ser. No. 11/535,114 are all hereby incorporated in their totality by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to learning aids and more specifically it relates to a hand-held dry-erase board system for efficiently combining a dry-erase board, a marker and an eraser into one package.

2. Description of the Related Art

Any discussion of the related art throughout the specification should in no way be considered as an admission that such prior art is widely known or forms part of common general knowledge in the field.

Learning aids have been in use for years. Typically, learning aids have included items such as flashcards, small chalk boards and small dry-erase boards. When using flash-cards, a student or teacher will read the question on one side of the flashcard and, when ready, flip it over to read the answer. Portable chalk boards and dry-erase boards usually include a board along with a piece of chalk or dry-erase marker and then a separate eraser. The student or teacher may write a question on one side of the board and then either erase it, or if the board has two sides, flip it over to reveal the answer (providing the answer was previously written on the back).

A disadvantage with flashcards is that they are not usually able to be modified and are generally not written on. This can hinder the student's learning ability as the flash card may not adequately describe the solution to the given problem. Portable chalk boards pose the problem of leaving messy chalk dust and small pieces of chalk everywhere. Chalk boards can also be difficult to read from a distance (e.g., located at the back of a classroom). A problem with past portable dry-erase boards is that it can be cumbersome to carry around a separate board, marker and eraser simultaneously.

While these devices may be suitable for the particular purpose to which they address, they are not as suitable for efficiently combining a dry-erase board, a marker and an eraser into one package. Past chalk boards and dry-erase boards have posed a significant problem in that it can be very cumbersome to carry around a board, a marker or chalk and an eraser at one time.

In these respects, the hand-held dry-erase board system according to the present invention substantially departs from the conventional concepts and designs of the prior art, and in so doing provides an apparatus primarily developed for the purpose of efficiently combining a dry-erase board, a marker and an eraser into one convenient package.

BRIEF SUMMARY OF THE INVENTION

Disclosed is a hand-held writing system for use with a writing instrument, having a frame having a height along a Y-axis, a width along an X-axis, and a depth along a Z-axis, where the frame defines at least one substantially planar writable surface along a portion of the frame's height and width, the frame further defines an outside surface along the frame's depth at a perimeter of the writable surface. There is a handle having at least one proximal end and at least one distal end where the proximal end of the handle is attached to the frame at a point on the frame other than the substantially planar writable surface. The distal end extends unattached to the frame and forms an ergonomic gripping surface apart from the frame. The gripping surface is capable of being encircled by a user's hand. There is at least one retainer attached to the writing system where the retainer is capable of removably securing the writing instrument.

The invention relates to a hand-held writing system which includes a frame, a handle, and a clip. At least one writable surface, and optionally a second writable surface on the opposing surface to the first writable surface, may also be located within the frame. The system includes a handle which is attached to the frame at one end. A clip is attached to the handle to permit a writing instrument to fit in between and be removably secured to the handle.

In one embodiment, the writable or writing surface of the system includes a smooth laminate finish which is suitable for writing with a dry-erase marker. The surface would thus be a write on-wipe off surface. Such a marker would include a marker handle and a writing tip, and preferably includes a cap which is removably attached to the marker and covers the writing tip when not in use. The dry-erase marker may further include an eraser suitable for erasing markings from the writing surface of the system. The eraser may be attached to the cap or to the end of the marker distal to the writing tip.

In another embodiment, the hand-held writing system frame, first writable surface and second writable surface is substantially transparent.

In yet another embodiment, the frame has at least one internal compartment in fluid communication with a channel of a desired height and width and depth defining one or more perimeter outside surface edge and the channel allows for the insertion of at least one printable substrate into the compartment.

In another embodiment, distal end of the handle may be substantially parallel to the Y-axis, substantially parallel to the X-axis distal end of the handle or substantially parallel to the Z-axis. Substantially parallel refers to zero degrees to 30 degrees from any axis.

In another embodiment, at least one perimeter outside surface edge has one or more stabilizing protrusions extending in a perpendicular direction from the substantially planar writable surface substantially opposite the handle.

The handle of the system of the present invention may be designed of a specific size and shape to be held comfortably by a user and may have an ergonomic gripping structure and configuration. In a particular embodiment, the handle may include a second clip on the side of the handle opposing the side containing the first clip. In this way, the handle may be capable of supporting a second writing instrument simultaneously with the first. The clips are comprised of first and second ribs within which the writing instruments may be stored when not in use. The ribs may be positioned below the surface of the handle to prevent the clip from interfering with a user gripping the handle. Each rib may include first and second locking members at a distance slightly smaller than the diameter of the writing instruments. The locking members permit the writing instrument may be removably fastened between the ribs to keep the instruments affixed to the handle when not in use.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
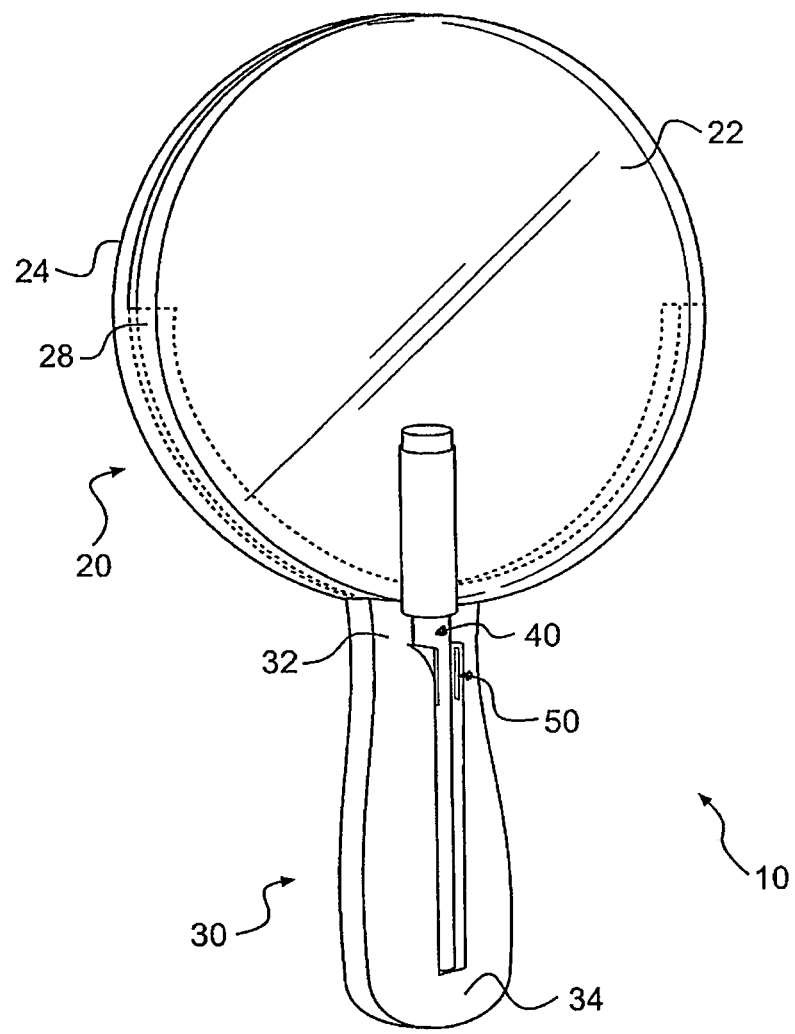
FIG. 1 is an upper perspective view, without a printable substrate.

Turning now descriptively to the drawings, in which similar reference characters denote similar elements throughout the several views, FIGS. 1 through 5 illustrate a hand-held dry-erase board system 10, which comprises a frame 20 including a substantially planar first writable surface 22, a handle 30, wherein the handle 30 includes an upper or proximal end 32 and a lower or distal end 34 and wherein the proximal end 32 of the handle 30 is attached to the frame 20. A clip 50, used as a retainer is attached to the handle 30 along the handle 30 axis and wherein the clip 50 secures a marker unit 40.

B. Frame

The frame 20 is preferably comprised of a circular structure and configuration as shown in FIGS. 1 through 4; however it is appreciated that the frame 20 may be comprised of various shapes rather than the shown embodiment of a paddle, such as but not limited to square, rectangular and triangular or thematically decoratively formed or where the perimeter forms a desired shape. Thematically decoratively formed refers to any shape that represents a silhouette, such as, but not limited to, a fruit, an animal or any structure identifiable by its outline. The frame 20 is preferably comprised of a stiff material (e.g., wood, masonite, plastic, etc.) and is suitable for holding a writable surface. The frame supports the first writable surface 22 and optionally a substantially planar second writable surface 24 on opposing sides of a common plane within the frame 20 surface edge perimeter 26 and an outside surface edge 28. The first writable surface 22 and second writable surface 24 in total thickness may be coplanar or more or less than the thickness of the frame 20.

Frame 20 may also be a substantially transparent material which would a user to peer through any writable surface 22, 24 to view a printable substrate 60 inserted within the frame 20. The surface edge perimeter 26 is defined by the shape of the frame 20 in terms of an x-axis in a horizontal direction defining the width of the frame 20, a y-axis in a vertical direction defining the height of the frame and a z-axis in a horizontal direction perpendicular to both the x-axis and y-axis defining a depth of the frame 20. The depth of the frame is between 0.5 inches and 2.5 inches.

Figure 4:
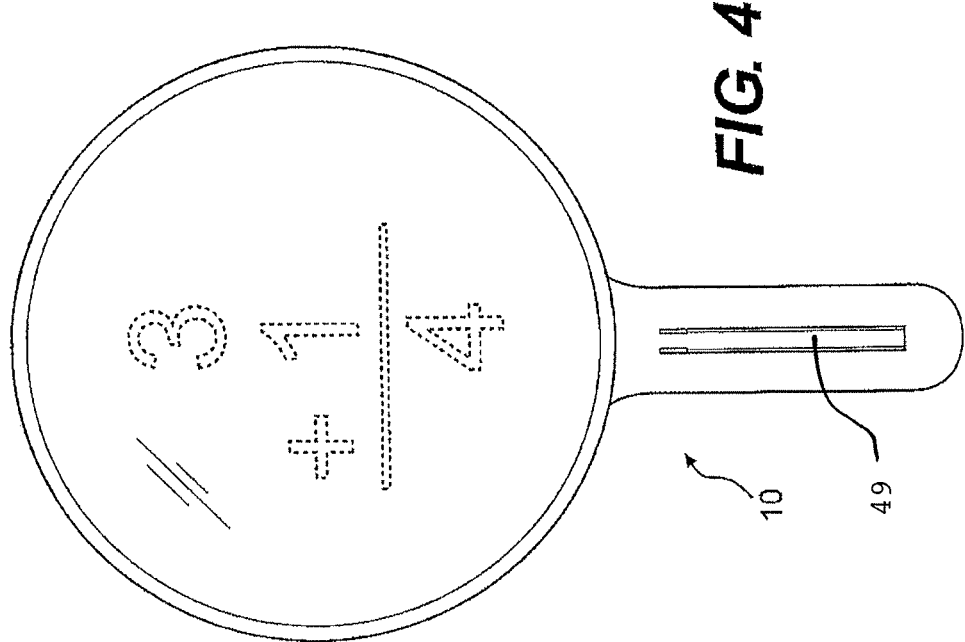
FIG. 4 is a rear view with a solution written on the second surface.
Figure 3:
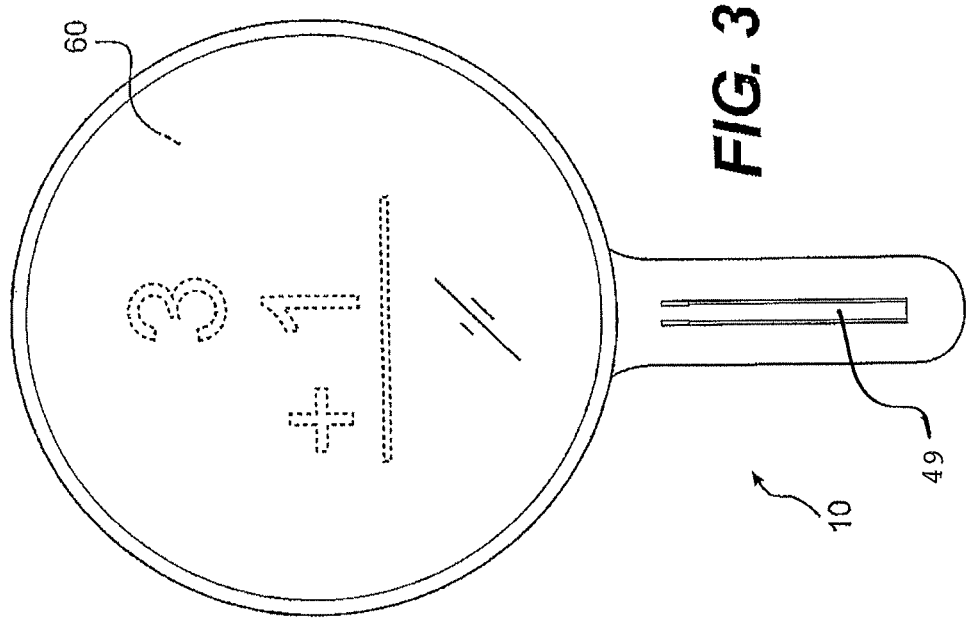
FIG. 3 is a front view with a question written on the first surface.

The first writable surface 22 and second writable surface 24 are preferably on opposite sides of and within the surface edge perimeter 26 of the frame 20, as shown in FIGS. 3 and 4. The first writable surface 22 and the second writable surface 24 are preferably of a substantially similar configuration having a similar surface edge perimeter. The first writable surface 22 and the second writable surface 24 are also of the same structure and configuration as the shape of the frame 20. The size and shape of the first writable surface 22 and the second writable surface 24 are similar, but slightly smaller in diameter and within the surface edge perimeter 26 of, the circular configuration shown of the frame 20.

The first writable surface 22 and the second writable surface 24 are preferably comprised of a smooth laminate coating (e.g., film, paper, vinyl, porcelain, epoxy-coated film, ultraviolet cured liquid, varnish, etc.) or any coating that can be written upon and erased with dry-erase markers and erasers, as shown in FIGS. 3 and 4. The coating used for the first writable surface 22 and the second writable surface 24 is preferably substantially similar. The first writable surface 22 and the second writable surface 24 may also have a preprinted outline of any form of indicia (e.g., graph, cursive lines, basketball court, line up of football players, etc.).

The first writable surface 22 and the second writable surface 24 may be substantially transparent. A substantially transparent surface may be defined as a surface in which an object on the opposite side from the viewer may be visibly distinguished. This may include colored or optically translucent plastics. The transparent writable coating may also have a substantially transparent writable coating which may be removeably attached and may have a preprinted outline of any form of indicia.

The frame 20 when substantially transparent has of at least one internal compartment 205 of a desired height and width and depth within the depth of the frame 20 in fluid communication with an aperture 210 of a desired height and width and depth defining one or more perimeter outside surface edge 215 such as a front surface edge 220 and a rear surface edge 225 bordering the aperture 210. The at least one aperture 210 extends from a point on a first perimeter outside surface edge 217 laterally within the depth of the frame 20 to a second point on the perimeter outside surface edge 218 wherein the aperture 210 provides an opening to enable the insertion of the printable substrate 60 and is defined by the point on the perimeter first outside surface edge 217 to the second point on an outside surface edge 218 and extending longitudinally within the depth of the frame 20 to a third point on the perimeter outside surface edge 219 substantially away from the handle 30. Outside surface edge 217 and outside surface edge 218 are separated by an aperture 210 depth along a z-axis direction. In one embodiment at least a portion of the aperture 210 depth is less than the internal compartment 205 depth, configured so as to removably retain a substrate 60 within the internal compartment 205 after the substrate 60 has been inserted through the aperture 210 and into the internal compartment 205. The retaining member 245 also allows the release of the substrate 60 to enabling the removal of the substrate. The retaining member 245 may alternatively be in the form of one or more end caps or clips that could be slid over the aperture 210 or, as in the case of FIG. 10A, on one or more sides or over the top of the frame 20 at a desired point.

Figure 10A:
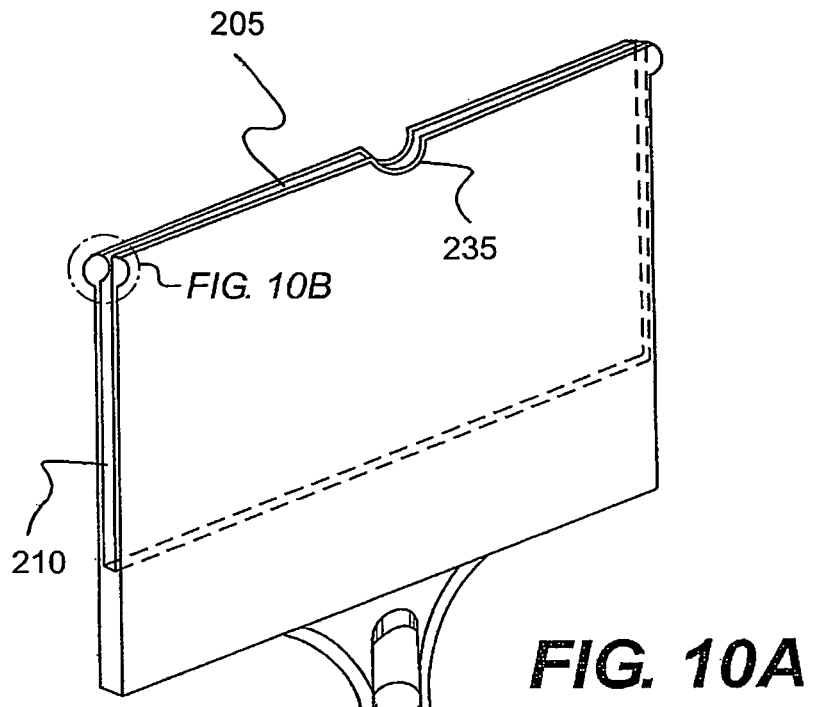
FIG. 10A is a perspective view of an embodiment with an access depression.

The aperture 210 is in fluid communication with the internal compartment 205 within the depth of the frame 20. The aperture 210 also defines at least a front outside surface edge 220 and rear outside surface edge 225 as determined by the frame 20 shape. The aperture 210 allows for the insertion of at least one printable substrate 60 into the internal compartment 205. Internal to the aperture 210 is an internal presentation surface 240 in which the printable substrate 60 surface rests and allows for visualization of the printable substrate 60. In essence internal presentation surface 240 is substantially parallel with the planar writable surface 22, 24, so that the printable substrate 60 is visible through the planar writable surface 22, 24. The internal presentation surface 240 may be the front, back or both of the internal surfaces of the aperture 210 or some other structure that operates as a surface to support the printable substrate 60 when inserted into the aperture 60 and internal compartment 205. An aspect of this support is that the printable substrate 60 is supported in a position to be reasonably visible through at least a portion of the at least one writable surface 22, 24 that is substantially transparent. The aperture 210 extends from a first point on the side surface 28 to a second point on the side surface 28 where the aperture 210 provides an opening of a desired size and shape within the side surface 28 for access to the internal compartment 205. The aperture 210 has an aperture-width along the X-axis that is equal to or less than the compartment-width and is sufficient for the insertion of a substrate 60 having a predetermined substrate-width through the aperture 210 and into the internal compartment 205. As illustrated in FIG. 10A, the aperture 210 may be open on the sides or may simply be an internal compartment 205 defined by closed sides of the frame 20, allowing for substrate 60 to be inserted and removed through the aperture 210 on the top of the frame 20.

Figure 8:
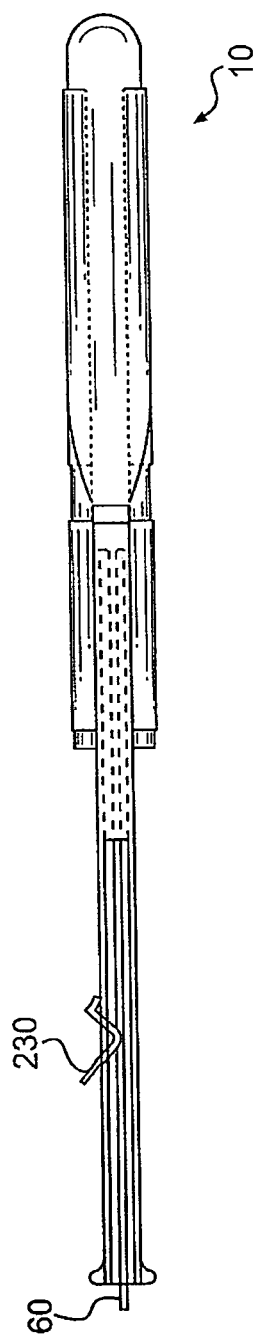
FIG. 8 is a side view of an embodiment with a retainer for the printable substrate.
Figure 9:
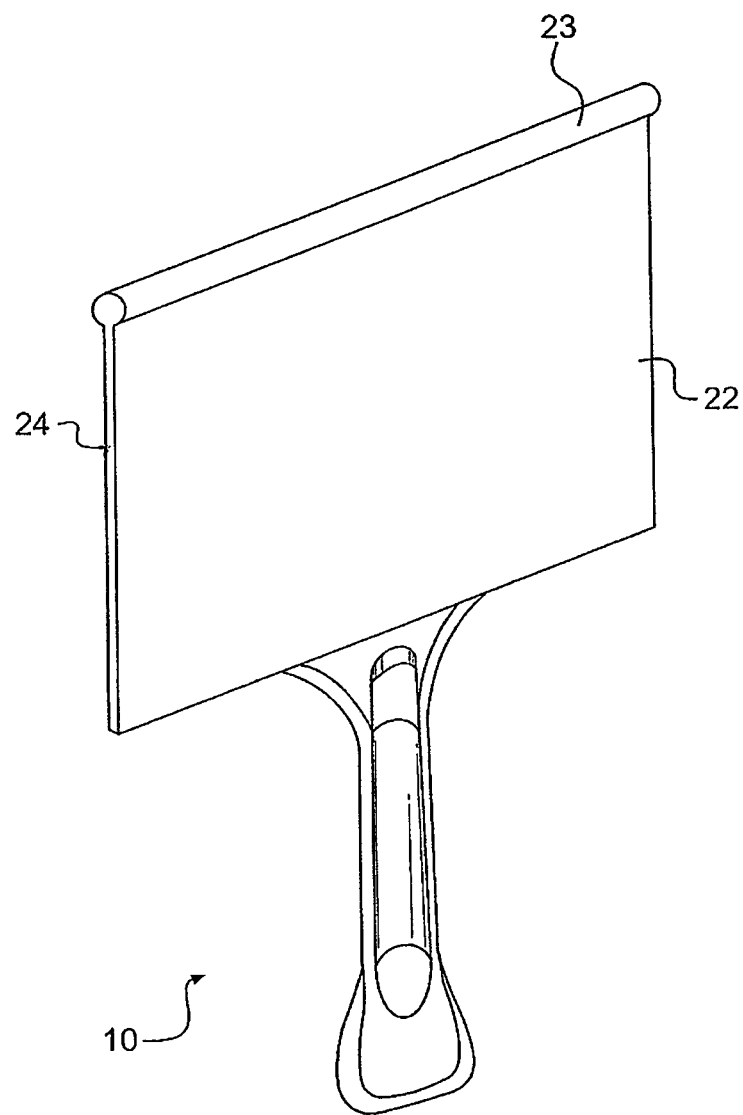
FIG. 9 is a perspective view of an embodiment with a single stabilizing projection.
Figure 10B:
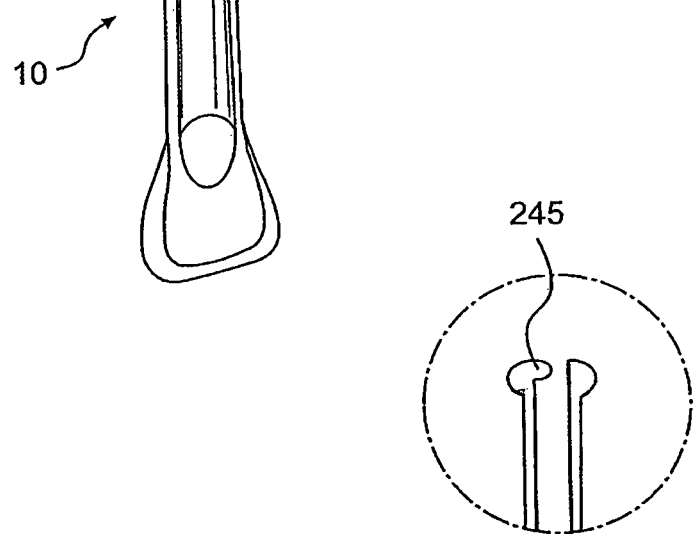
FIG. 10B is a detail of a retaining member.
Figure 11:
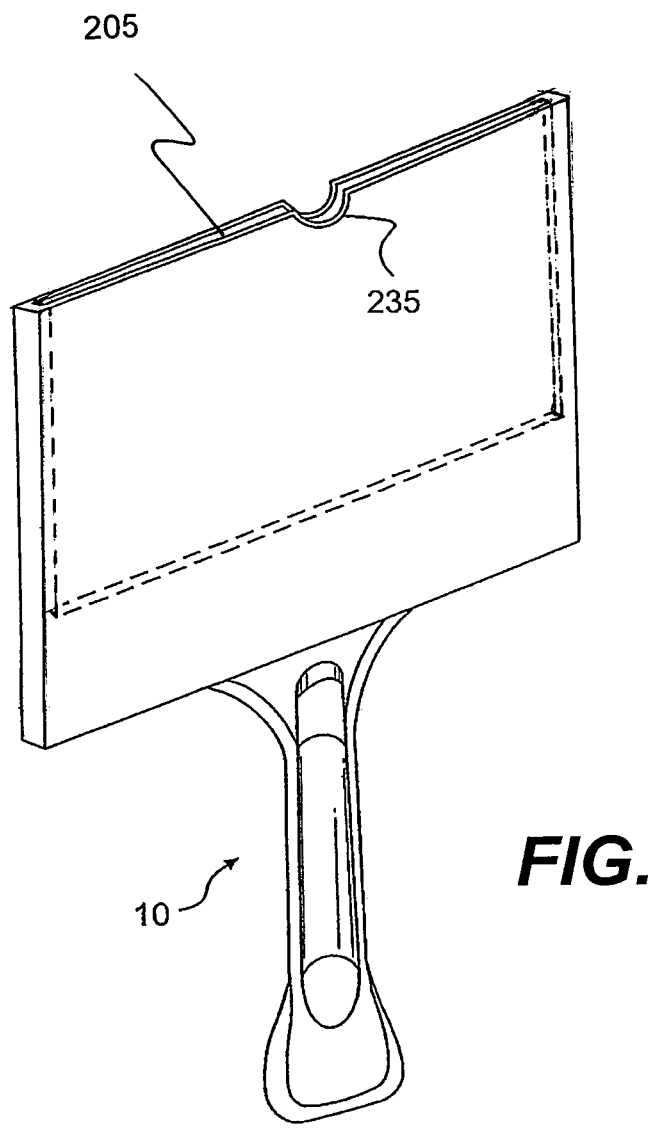
FIG. 11 is a perspective view of an embodiment with an access at the top of the frame and enclosed sides forming an internal compartment.

As shown in FIG. 10B the frame 20 also has a retaining member 245 within the aperture 210 for restraining, retaining or blocking the printable substrate 60, preventing it from shifting or falling out. The retaining member 245 may be a type of blocking structure such as flaps with buttons, snaps, or other fastener, toggles, plugs, end caps, hook and loop fasteners, snaps, elastic straps or gum bands, and otherwise adjustable members. The retaining member 230 (FIG. 8) may also be a gripping structure to include clips, clamps, binder clips, semi permanent adhesive, friction points, buttons, etc.

The frame 20 also may have an access depression 235 (FIG. 10A) adjacent to the perimeter to allow for removal of the printable substrate 60 via the aperture 210 and from the internal compartment 205. The access depression 235 acts essentially as a finger notch for inserting the user's finger and thumb substantially on each side of the printable substrate 60 and allows the user to grasp the printable substrate 60 for insertion or removal. The access depression 235 on the perimeter may also extend into either or both writable surfaces 22, 24.

The frame 20 has at least one stabilizing protrusion 23 on the surface edge perimeter 26 which allow for the hand-held dry-erase board system 10 to be laid down on a horizontal or vertical surface keeping the first and second writable surface 22, 24 to remain separate from the horizontal or vertical surface in order to ensure the written image remains legible. The stabilizing protrusion 23 is essentially the same or equivalent thickness as the proximal end 32 and distal end 34 of the handle 30 with the protrusion height beyond that of the first and second writable surfaces 22, 24. The stabilizing protrusions 23 prevent the written information from coming in contact with objects on the surface and from becoming illegible by contact with any object on the horizontal or vertical surface. At least one stabilizing protrusion 23 is typically located away from the handle.

The handle 30 is preferably comprised of a material as to be easily gripped by a user (e.g., dense foam, plastic, rubber, etc.), as shown in FIGS. 1 through 5. The handle 30 is preferably an integrally formed structure with the frame 20 where the proximal end 32 is attached to the outer perimeter 28 at a point on the frame 20; however the handle 30 may be comprised of a separate structure from the frame 20. The handle 30 is also preferably comprised of an ergonomic gripping design structure and configuration with a maximum effective diameter greater than the average depth of the frame 20 and may be thicker or thinner than the thickness of the frame 20, substantially circular or round in cross-section, or may be of various shapes from the proximal end 32 to the distal end 34. A section of the handle 30 may be substantially elliptical or oval in cross-section and have rounded corners as well. The distal end 34 extends unattached from the frame 20 forming an ergonomic gripping surface shape for a hand substantially within the plane of the first writable surface 22 and second writable surface 24 combined and may have a substantially flat contact surface positioned so as to rest between the thumb and the index finger of a user gripping the handle 30. The handle 30 is capable of being fully encircled by a user's hand.

Figure 2:
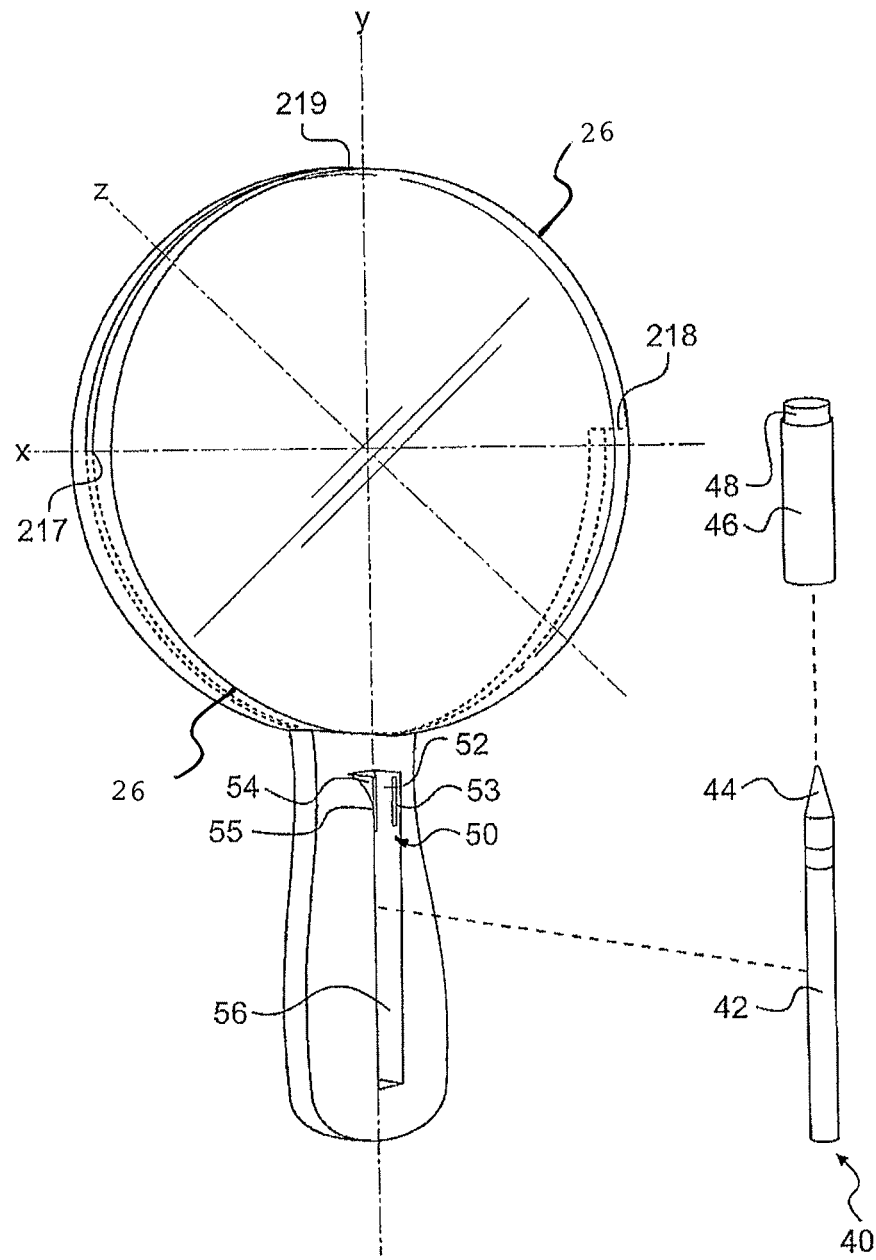
FIG. 2 is an upper exploded perspective view.
Figure 5:
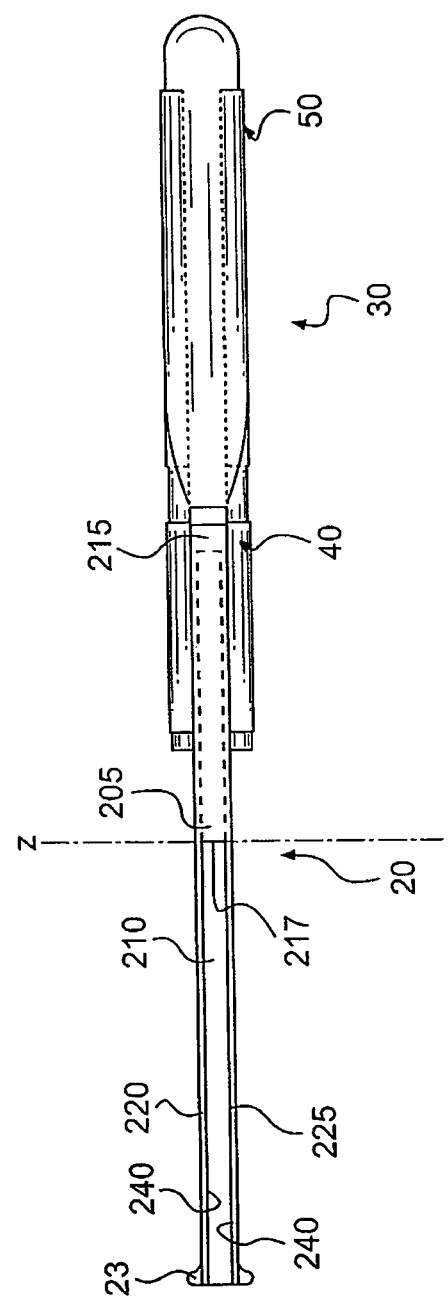
FIG. 5 is a side view with the marker attached to the handle.
Figure 6:
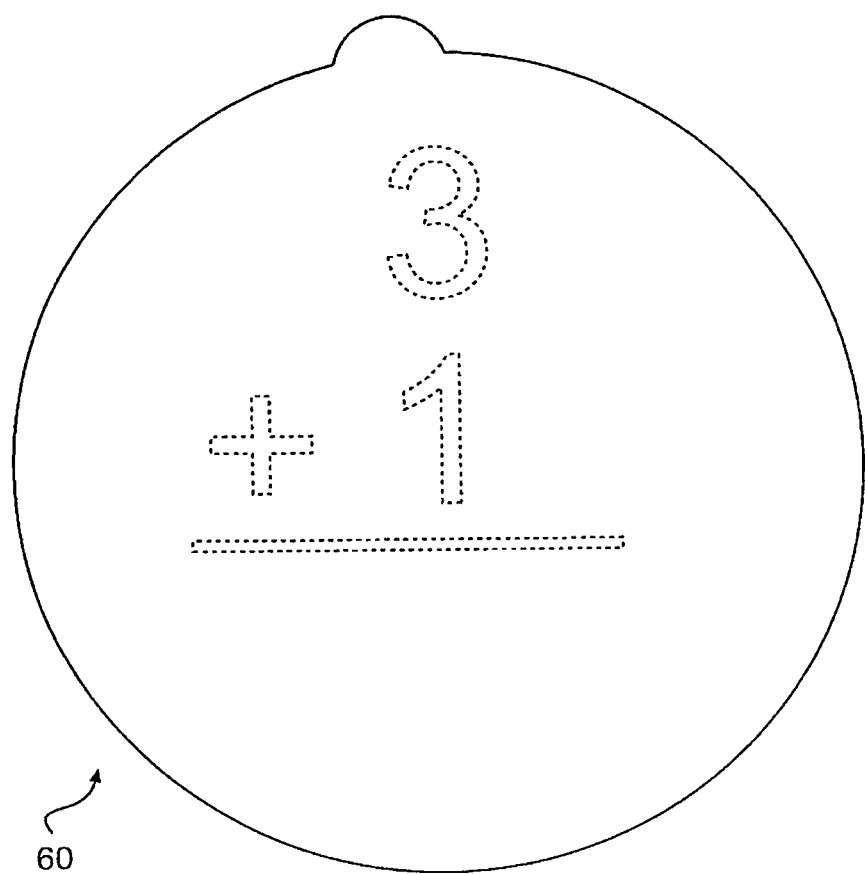
FIG. 6 is a front view of a printable substrate with information.
Figure 7:
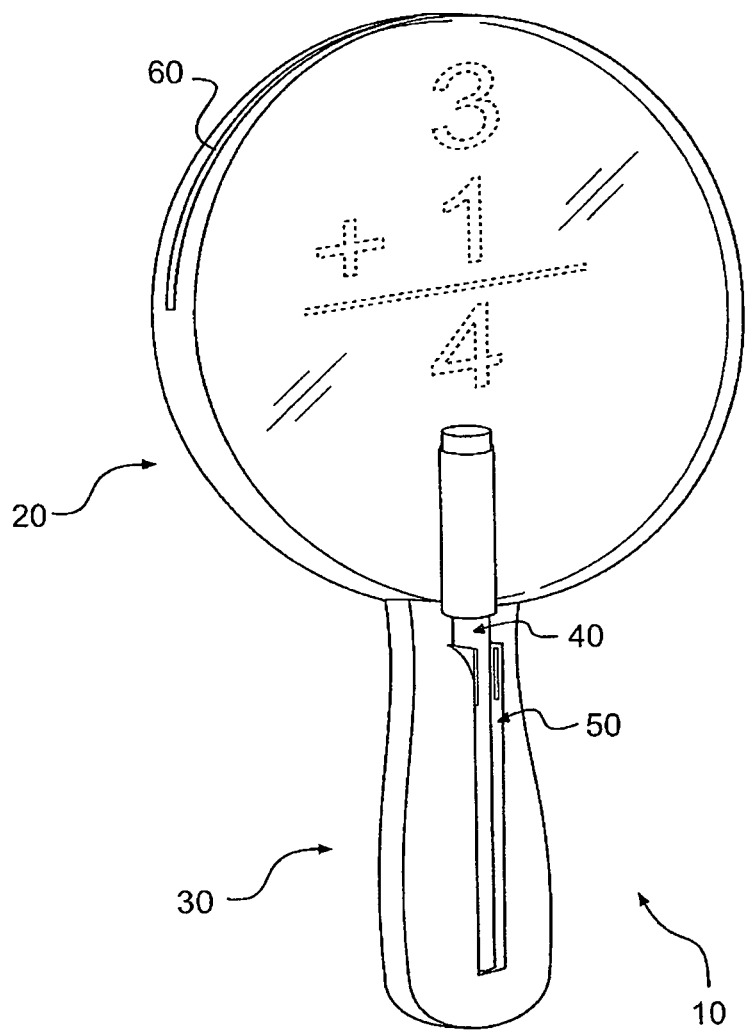
FIG. 7. is a perspective view of the hand-held dry-erase board system including the printable substrate.

The handle 30 preferably includes at least one clip 50 on the same side of the hand-held dry-erase board system 10 as the first writable surface 22, where the clip 50 removeably securely holds at least one marker unit 40, as shown in FIGS. 1 through 3. The handle 30 is optionally formed to include a clip 50 on both sides of the handle 30 to allow the user to removeably secure more than one marker unit 40 to the hand-held dry-erase board system 10 as illustrated in FIGS. 3 through 5. A portion of the handle 30 defines a recessed notch 49 extending along the handle and the clip 50 is disposed along about the notch 49 so as to retain the writing instrument within the notch 49. The notch 49 is closed at the distal end 34 of the handle 30.

The clip 50 preferably includes a first rib 52 and a second rib 54. The first rib 52 and the second rib 54 are preferably of a substantially similar structure and configuration and essentially parallel to each other along the handle 30. The first rib 52 and the second rib 54 are preferably comprised of channel structures that extend into the handle 30, as not to be in the way from gripping the handle 30, as shown in FIGS. 1 through 5. A writing instrument or marker unit 40 is allowed to fit in-between the first rib 52 and the second rib 54. The portion of the clip 50 furthest below the outer surface of the handle 30 is preferably coplanar with the edge of the first writable surface 22 as shown in FIG. 5. In this way, the marker unit 40 rests in a horizontal position within the clip 50 when the hand-held dry-erase board system 10 is laid on a horizontal surface, such as a table or a desk.

The clip 50 may embed the marker unit 40 within the profile of the handle 30 defining a cavity 56 with the cavity 56 being below the surface of the handle 30 which may allow the marker unit 40 to reside outside the profile of the handle 30 or any combination thereof.

The first rib 52 preferably includes a first locking member 53 and the second rib 54 preferably includes a second locking member 55. The first locking member 53 and the second locking member 55 are preferably positioned towards the proximal end 32 of the handle 30 and medial to the clip 50. The first locking member 53 and the second locking member 55 extend towards one another to create a slightly smaller width between the first locking member 53 and the second locking member 55 than the width between the first rib 52 and the second rib 54 near the distal end 34 of the handle 30. This to provide a secure holding place for the marker unit 40, when the marker handle 42 is in the clip 50, as shown in FIG. 1.

D. Marker Unit

The marker unit 40 is preferably a writing instrument of a structure and configuration of a dry-erase marker. The marker unit 40 includes a writing tip 44 and the marker handle 42, as shown in FIG. 2. The writing tip 44 is used to write on the first writable surface 22 and the second writable surface 24. The marker unit 40 also preferably includes a cap 46, where the cap 46 connects to the marker handle 42 and covers the writing tip 44 from outside elements. It is also appreciated that the marker unit 40 may be comprised of a configuration rather than a dry erase marker, such as but not limited to a chalk configuration or pencil configuration.

The cap 46 also preferably includes an eraser 48, as shown in FIGS. 1, 2 and 5. The eraser 48 is preferably positioned at the top of the cap 46 at the furthest point from the marker handle 42. The eraser 48 is preferably of a structure and configuration to erase writing on the first writable surface 22 and the second writable surface 24 from the writing tip 44. The eraser 48 is preferably comprised of a configuration of a standard dry erase board eraser; however it is appreciated that the eraser 48 may be comprised of various configurations rather than the shown embodiment, such as but not limited to a chalk board eraser configuration or pencil eraser configuration.

Printable Substrate

The channel 210 allows for the insertion of at least one printable substrate 60 into the compartment 205. The printable substrate 60 is of Mylar, paper, fabric or film or any printable surface that is generally in the form of a sheet. The printable substrate 60 is of a shape and size and width to fit conveniently within the channel 210 and internal compartment 205 within the hand-held dry-erase board system 10 and is generally visibly distinguishable through the first writable surface 22 and/or the second writable surface 24. The printable substrate surface 60 may be a blank, have a pattern, design or contain information. The printable substrate 60 is insertable and removeable through the channel 210 and into internal compartment 205 and may be secured by friction, elasticity, a barrier, a clip, semi-permanent adhesive or by design of the printable substrate 60.

E. Operation of Invention

The user first grasps the handle 30 in a way to not cover the marker unit 40. The marker unit 40 is then removed from the first locking member 53 and the second locking member 55 of the clip 50 by pulling the marker unit 40 longitudinally or by applying an angular force. The cap 46 from the marker unit 40 is then removed from the marker handle 42. The user may then firmly grasp the marker handle 42 and write a question (e.g., "3+1=_____"), using the writing tip 44, on the first writable surface 22, as shown in FIG. 3. The user may also write the appropriate answer to the given question, at this time, on the second writable surface 24 (e.g., "3+1=4"), as shown in FIG. 4.

In another manner, the user may insert the printable substrate 60 within the channel 210 and internal compartment 205 to act as a barrier between the first writable surface 22 and the second writable surface 24. The printable substrate 60 may have the question (e.g., "3+1=_____") preprinted on it that is visible through the substantially transparent first writable surface 22 and second writable surface 24. The answer to the question may be preprinted on the back of the printable substrate 60 facing the second writable surface 24 or may be blank. The user, then may write the answer (e.g. "4") on the second writable surface 24 for viewing or may write the answer on the first writable surface 22 as in this example (e.g., "3+1=4"). In this manner the printable substrate 60 remains clear of marks from the user and can be used many times over.

The printable substrate 60 may be held within the hand-held dry-erase board system 10 by friction, elasticity, barrier, clip, semi-permanent adhesive or design. The design of the printable substrate 60 may have a tab that may be folded over to provide sufficient friction to hold the printable substrate 60 in place.

The user then replaces the cap 46 back on the marker handle 42 and then places the marker handle 42 back into the first locking member 53 and the second locking member 55 of the clip 50. The user now holds up the hand-held dry-erase board system 10 for at least one individual to view. This is done in a manner so that the viewer(s) may only see the first writable surface 22 of the hand-held dry-erase board system 10.

Once an individual guesses the answer to the question the user turns around the hand-held dry-erase board system 10 to reveal the second writable surface 24 and the answer to the question. The user may now remove the marker unit 40 from the first locking member 53 and the second locking member 55 of the clip 50, and rub the eraser 48 over the writing on the first writable surface 22 and the second writable surface 24. The eraser 48 erases the writing on the first writable surface 22 and the second writable surface 24 so that the user may now write a new question for viewing. Every individual in the group may also utilize the handheld dry-erase board system 10 to respond to the users question with their individual response. To write a new question, the above process is simply repeated or a new printable substrate 60 may be inserted in the channel 210 and internal compartment 205 with a new question.

When the user has written a question or answer, the hand-held dry-erase board system 10 may be laid horizontally on a surface. The stabilizing protrusions 23 form at least one point in conjunction with the handle 30 to prevent the first writable surface 22 or second writable surface 24 from contacting the surface and damaging the writing.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

What is claimed is:

1. A hand-held writing system for use with a writing instrument, comprising:
    a frame having a height along a Y-axis, a width along an X-axis, and a depth along a Z-axis, wherein the frame defines at least one substantially planar writable surface along a portion of the frame's height and width, the frame further defining a side surface along the frame's depth at a perimeter of the writable surface;
    a handle having at least one proximal end and at least one distal end, wherein the proximal end of the handle is attached to the frame at a point on the frame other than the substantially planar writable surface, with the at least one distal end extending unattached to the frame and forming an ergonomic gripping surface apart from the frame, the ergonomic gripping surface capable of being encircled by a user's hand;
    at least one retainer attached to the writing system, wherein the retainer is capable of removably securing the writing instrument; and
    wherein the handle has a substantially flat contact surface positioned so as to rest between a thumb and index finger of a user gripping the handle.

2. The hand-held writing system as in claim 1, wherein the distal end of the handle extends along the Y-axis.

3. The hand-held writing system as in claim 1, wherein the distal end of the handle extends along the X-axis.

4. The hand-held writing system as in claim 1, wherein the distal end of the handle extends along the Z-axis.

5. The hand-held writing system according to claim 1, wherein the at least one substantially planar writable surface comprises two opposing sides having a common side surface, so as to form a first writable surface and a second writable surface on opposite sides of the frame.

6. The hand-held writing system according to claim 1, wherein at least a portion of the at least one writable surface is substantially transparent.

7. The hand-held writing system of claim 6, wherein:
    the frame defines an internal compartment having a desired compartment-height, compartment-width, and compartment-depth;
    the frame defines an aperture within the side surface, the aperture in fluid communication with the internal compartment and configured for insertion of a substrate having a predetermined substrate-width through the aperture and into the internal compartment; and
    the internal compartment includes an internal presentation surface that is substantially parallel with the at least one writable surface, so that the substrate is visible through the at least one writable surface.

8. The hand-held writing system as in claim 7, wherein the aperture extends from a first point on the side surface to a second point on the side surface, wherein the aperture provides an opening of a desired size and shape within the side surface for access to the internal compartment, the aperture having an aperture-width along the X-axis that is equal to or less than the internal compartment-width, and sufficient for the insertion of a substrate having the predetermined substrate-width through the aperture and into the internal compartment.

9. The hand-held writing system as in claim 8, wherein the frame defines a first edge and a second edge, the first and second edges formed by an outer surface bordering the aperture, the first and second edges separated by an aperture-depth along a Z-axis direction.

10. The hand-held writing system of claim 9, wherein the internal compartment is adapted to removeably retain the at least one substrate by an adjustable retaining member configured to block the aperture after the substrate has been inserted through the aperture and into the internal compartment and to clear the aperture to enable the insertion or removal of the substrate.

11. The hand-held writing system of claim 9, wherein the internal compartment is adapted to removeably retain the at least one substrate by an adjustable retaining member configured to grip the substrate after the substrate has been inserted through the aperture and into the internal compartment and to release the substrate to enable the removal of the substrate.

12. The hand-held writing system as in claim 9, wherein at least a portion of the aperture-depth is less than the internal compartment-depth, so as to removably retain a substrate within the internal compartment after the substrate has been inserted through the aperture and into the internal compartment.

13. The hand-held writing system as in claim 8, wherein the perimeter of the writable surface adjacent to the aperture defines at least one access depression within the perimeter along the X- and Y-axes, so as to provide access to a portion of the substrate after the substrate has been inserted through the aperture and into the internal compartment.

14. The hand-held writing system of claim 1, wherein the handle further comprises a maximum effective diameter greater than an average depth of the frame, the frame further comprises at least one stabilizing protrusion extending along the Z-axis for a desired distance substantially equivalent to the distance beyond the writable surface along the Z-axis of the handle at a point of maximum effective diameter, and wherein the at least one stabilizing protrusion is positioned on the perimeter of the writable surface at a point opposing the distal end of the handle.

15. The hand-held writing system according to claim 1, wherein the at least one substantially planar writable surface comprises two opposing sides having at least a portion of common perimeter along a plane substantially parallel with the X and Y-axes, wherein the perimeter forms a desired shape.

16. The hand-held writing system according to claim 1, wherein at least a portion of the handle has an elliptical cross-section with rounded corners capable of being encircled by the user's hand.

17. The hand-held writing system according to claim 1, wherein the at least a portion of the handle has a substantially circular cross section with rounded corners capable of being encircled by the user's hand.

18. The hand-held writing system according to claim 1, wherein the frame depth has a thickness of about 0.5-2.5 inches.

19. The hand-held writing system according to claim 1, wherein the retainer comprises at least one clip attached to the handle, wherein the at least one clip removeably retains a writing instrument; and
    wherein the handle has an outer surface, the at least one clip of the handle extends into the handle to define a cavity, a portion of the cavity being below the outer surface and coplanar with the writable surface.

20. The hand-held writing system of claim 1, wherein said writable surface is comprised of a material adapted to be written upon with a dry-erase marker.

* * * * *